INVENTORS
Ralph C. Brooks
Fred S. Whaley
BY Frank E. Miller,
ATTORNEY

Patented Nov. 25, 1952

2,619,073

UNITED STATES PATENT OFFICE 2,619,073

FLUID PRESSURE TIMED CYCLE CONTROL APPARATUS

Ralph C. Brooks, Turtle Creek, and Fred S. Whaley, Greensburg, Pa., assignors to Westinghouse Air Brake Company, a corporation of Pennsylvania Application December 20, 1950, Serial No. 201,804

4 Claims. (Cl. 121—38)

1

This invention relates to fluid pressure timed cycle control apparatus and more particularly to such control apparatus for controlling a cycle of operation of a fluid pressure motor.

In certain operations performed by a fluid pressure motor of the type which responds to assume one operative position upon receipt of supply of fluid under pressure and to a repose position upon release of such supply of fluid under pressure it is desirable to hold such supply of fluid under pressure in the motor to prolong its operative position. When it is necessary for an operator to time the duration of retention of fluid under pressure in the motor and then, through conscious effort on the operator's part, effect release of such fluid under pressure, much of the operator's time is wasted in waiting to and for such release, prior to beginning a new cycle. When the motor is employed in a production set-up, such waste time will materially increase the cost of the time operation being performed by the motor.

In view of the foregoing, it is a prime object of the invention to provide fluid pressure apparatus for effecting operation of a fluid pressure motor through a timed cycle automatically without requiring the conscious effort on the part of an operator with respect to timing the cycle.

Figure 1:
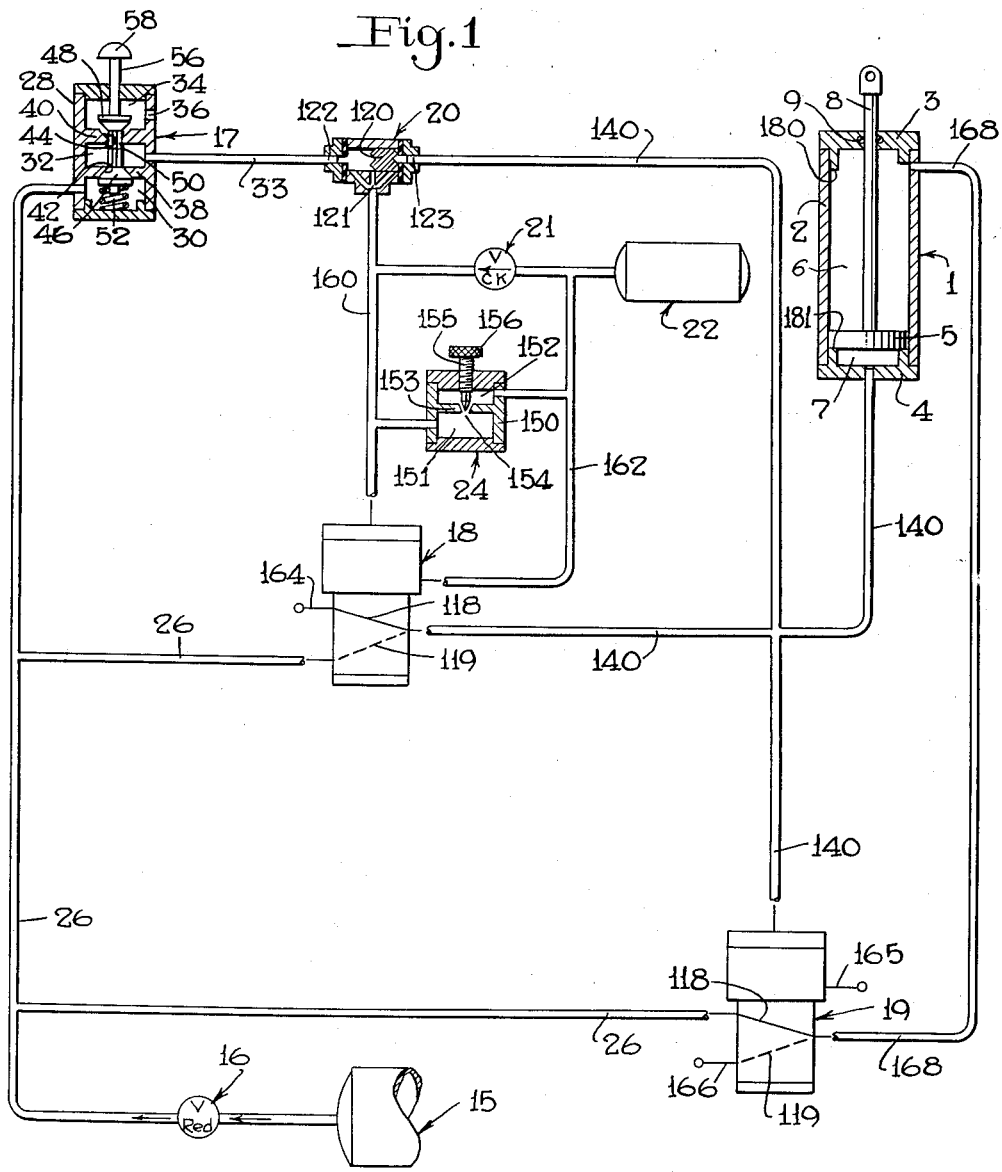
Figure 2:
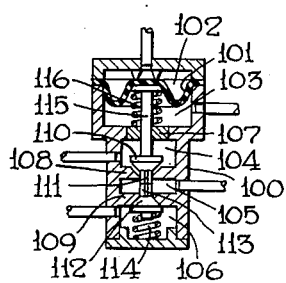

Other objects and advantages will become obvious from the following more detailed description of the invention taken in connection with the accompanying drawing, in which:

Fig. 1 is a schematic representation, partly in outline and partly in section of a fluid pressure control apparatus embodying the invention; and Fig. 2 is schematic representation in cross-section of a relay valve device, several of which are shown in outline in Fig. 1.

Description

Referring to Fig. 1, the control apparatus embodying the invention is shown associated with a fluid pressure motor 1, which, for sake of illustration, may comprise a hollow cylindrical casing 2 closed at opposite ends by removable heads 3 and 4, respectively. A piston 5, reciprocably disposed in the casing 2, is subjected opposingly to pressure of fluid in chambers 6 and 7 at its opposite sides, which chambers are defined by heads 3 and 4, respectively. A piston rod 8 is attached at its one end for reciprocable movement with the piston 5. The rod 8 extends through the pressure chamber 6 and through an accommodating opening in the head 3. A sealing ring 9 cooperable between the casing 2 and rod 8 prevents leakage of fluid under pressure from chamber 6 past rod 8 to atmosphere. The outermost projecting end of the piston rod 8 is adapted for connection to a device (not shown) to be moved from one position to another position, to be held in the latter position for a certain length of time and then to be returned to its original position to complete a cycle of operation.

The control apparatus embodying the invention comprises a fluid pressure storage reservoir 15 for storing fluid under pressure, such as compressed air from a compressor (not shown), to act as a source of supply of working medium for the apparatus; a reducing valve device 16 to regulate and maintain the pressure of the fluid supplied to the apparatus from the reservoir 15; a push button valve device 17 to control starting of a cycle of operation of the apparatus; relay valve devices 18 and 19, a shuttle valve device 20, a check valve device 21, a volume reservoir 22, and a needle valve device 24 arranged, as will be described subsequently, in cooperation between the push button valve device 17 and the motor 1 to effect and time supply and release of fluid under pressure to and from the respective pressure chambers 6 and 7 in the motor 1.

The system supply pressure should be about fifty pounds for example, and it is the function of the reducing valve device 16 to maintain such pressure when fluid at a greater pressure is supplied to the reservoir 15. Outlet from the reducing valve device 16 is connected to a fluid pressure supply pipe 26.

The push button valve device 17, for sake of illustration, schematically may comprise a casing 28 having a supply chamber 30 connected to a branch of the supply pipe 26, a delivery chamber 32 connected to a pipe 33, and an exhaust chamber 34 constantly open to atmosphere via a port 36. The delivery chamber 32 is separated from the supply chamber 30 by a partition 38 and from the exhaust chamber 34 by a partition 40. Aligned openings 42 and 44 are provided in partitions 38 and 40, respectively, which extend between the delivery chamber 32 and chambers 30, 34, respectively. A supply valve 46, disposed in supply chamber 30 is arranged to cooperate with a seat in partition 38 to control communication between delivery chamber 30 and said supply chamber. An exhaust valve 48, disposed in exhaust chamber 34, is arranged to cooperate with a valve seat formed in partition 40 to control communication between delivery chamber 32 and said exhaust chamber. Each of the valves 46 and 48 are attached to a respective fluted stem 50 slidably disposed in openings 42 and 44 and projecting into the delivery chamber 32 into abutment with one another. The length of the abutting fluted stems relative to the distance between the two valve seats is such that only one or the other of valves 46 and 48 will be seated at one time. A compression spring 52, disposed in supply chamber 30 is arranged to urge the supply valve 46 and the exhaust valve 48 toward their seated and unseated positions, respectively, in which they are shown in the drawing. To act as a medium through which the valves 46 and 48 may be actuated to unseated and seated positions, respectively, in opposition to action of the compression spring 52, a stem 56 is provided attached to valve 48, extending through exhaust chamber 34 and outwardly through an accommodating opening in the casing. The outermost projecting end of the stem 56 is provided with a button 58 to facilitate manual application of a thrust force to said stem for valve actuation.

Referring to Fig. 2, each of the relay valve devices 18 and 19, for sake of illustration, schematically may comprise a casing 100 having a diaphragm 101 disposed therein and subject to pressure of fluid in a diaphragm control chamber 102 on its one side and to pressure of fluid in a chamber 103 on its opposite side. Also formed in the casing are chambers 104, 105 and 106, chamber 104 being separated from chamber 103 by a partition 107 and from the chamber 105 by a partition 108. A partition 109 separates the chamber 105 from the chamber 106. A valve 110 is disposed in chamber 104 for controlling communication between the chamber 105 and said chamber 104. The valve 110 may be secured to a fluted stem 111 slidably mounted in a suitable bore extending through the partition 108, a valve seat being formed at the end of the bore opening into the chamber 104 to accommodate the valve 110. A valve 112, similar to valve 110, is disposed in the chamber 106 for controlling communication between the chamber 105 and said chamber 106. The valve 112 is attached to a fluted stem 113 which is slidably disposed in a suitable bore extending through the partition 109, a valve seat being formed in the end of said bore opening into the chamber 106 to accommodate the valve 112. Both of the fluted stems 111 and 113 project into and meet in the chamber 105. A bias spring 114 is disposed in the chamber 106 arranged to urge the valve 112 towards its seat and at the same time, through engagement of stems 111 and 113, to urge the valve 110 away from its seat. The valve 110 is operably connected to the diaphragm 101 by means of a rod or stem 115 extending through a bore in the partition 107. A control spring 116 is provided in chamber 103 to oppose deflection of the diaphragm 101 in the direction of chamber 103.

In operation of the relay valve device shown in Fig. 2, with the chamber 103 open to atmosphere, upon supply of fluid under pressure to the control chamber 102 the diaphragm 101 will deflect in the direction of the chamber 103 against opposition of the control spring 116 and the bias spring 114 and will cause seating of the valve 110 and unseating of the valve 112. With the valve 110 closed and the valve 112 open, chamber 105 will be closed to the chamber 104 and open to the chamber 106. Upon subsequent venting of fluid under pressure from the control chamber 102, the bias spring 114 and the control spring 116 will return the diaphragm 101 and valves 110 and 112 to the positions in which they are shown in the drawing, the valve 112 being seated and the valve 110 being unseated. With valve 110 seated and the valve 112 unseated, the chamber 105 will be closed to the chamber 106 and open to the chamber 104. If, at the time that fluid under pressure is supplied to the control chamber 102, the chamber 103 is charged with fluid at substantially the same pressure as that in said chamber 102, it will be seen that the effect of the pressure at one side of the diaphragm will balance the effect of pressure on the opposite side and said diaphragm will not deflect, but rather will remain stationary with the valve 112 remaining seated and the valve 110 remaining unseated. If, while the control chamber 102 and chamber 103 are charged with fluid under pressure and the diaphragm is thus stationary, the fluid under pressure is vented from chamber 103, the pressure of fluid in said control chamber will then deflect the diaphragm to seat valve 110 and unseat the valve 112 as aforedescribed. If, on the other hand, with the control chamber 103 charged with fluid under pressure, diaphragm 101 thus deflected and the chamber 103 vented to atmosphere, fluid under pressure is then supplied to the chamber 103 to balance the pressure forces on the diaphragm 101, the springs 114 and 116 will return the diaphragm and valves 110 and 112 to the positions in which they are shown in the drawing. The valve 112 will again be seated and the valve 110 unseated.

Hereinafter, in describing operation of any of the valve devices in the apparatus which are similar to the device shown in detail in Fig. 2, when the valve 110 is unseated and the valve 112 is seated, a communication, to be hereinafter designated 118, will be established connecting the chamber 105 to the chamber 104, and when the valve 110 is seated and the valve 112 unseated, a communication, to be hereinafter designated 119, will be established connecting the chamber 105 to the chamber 106. When either of communication 118 or 119 is established, the other is disestablished. The communication 118 is indicated symbolically in the different valve devices in the apparatus shown in Fig. 1 by the solid line bearing the reference numeral 118 and the communication 119 is indicated by a dash line bearing the reference numeral 119.

The shuttle valve device 20 in a well-known form may simply comprise the usual piston valve 120 which will assume a position to establish connection between an outlet opening 121 and whichever of two opposite inlet openings 122 and 123 is at a pressure greater than the other inlet opening and to vent said outlet opening 121 to atmosphere only when both of such inlet openings 122 and 123 are so vented.

One inlet opening 122 of shuttle valve device 20 is connected to the pipe 33 and the opposite inlet opening 123 of device 20 is connected to a branch of a pipe 140 which has other respective branches connected to the pressure chamber 7 in the motor 1, to the delivery chamber 105 in the relay valve device 18, and to the control chamber 102 in the relay valve device 19.

The check valve device 21 may be of any well-known type which is provided with an inlet and an outlet connection to respective pipes and which will allow for flow of such as fluid under pressure from its inlet to its outlet as indicated by the arrow shown in the drawing but will prevent flow in the opposite direction.

The needle valve device 24 for sake of illustration comprises a casing 150 having an inlet chamber 151 and an outlet chamber 152 formed therein; the two chambers being separated one from the other by a partition 153. The partition 153 is provided with a tapered opening 154 extending therethrough into which the conical shaped end of an adjustable needle valve element 155 is adapted to project in varying degrees for controlling the area available for flow of fluid under pressure through opening 154 from chamber 151 to chamber 152, in the usual manner. A portion of the needle valve element 155 may be in screw-threaded engagement with the casing 150 and another portion may project outwardly of the casing to allow for manual turning movement thereof. A knurled knob 156 attached to the outermost projecting end of valve element 155 facilitates such manual turning movement.

A pipe 160 and its branches connects the outlet opening 121 of the shuttle valve device 20 to the outlet of the check valve device 21, to the inlet chamber 151 in the needle valve device 24, and to the control chamber 102 in the relay valve device 18.

A pipe 162 and branches thereof connects the volume reservoir 22 to the inlet to the check valve device 21, to the outlet chamber 152 in the needle valve device 24, and to the chamber 103 in the relay valve device 18.

In the relay valve device 18, its chamber 104 is connected to atmosphere by way of a pipe 164, and its chamber 106 is connected to a branch of the fluid pressure supply pipe 26.

In the relay valve device 19, its chambers 103 and 106 are connected to atmosphere by way of pipes 165 and 166, respectively, its chamber 104 is connected to a branch of the fluid pressure supply pipe 26, and its chamber 105 is connected to the pressure chamber 6 in the fluid motor 1 via a pipe 168.

Operation

In operation of the fluid pressure control apparatus, assume that the storage reservoir 15 is charged with fluid at a pressure in excess of fifty pounds, for example, and that the reducing valve device 16 is set to deliver fluid at such as fifty pounds pressure to the supply pipe 26 which is so charged. Assume that the push button 58 of valve device 17 is in its outermost position and that therefore the valves 46 and 48 are in respective positions in which they are shown in the drawing, to close off the supply pipe 26 from the pipe 33 and to vent the latter pipe 33 and thereby inlet opening 122 of device 20 to atmosphere.

Assume further that the relay valve device 18 is in its position establishing its communication 118 venting the pipe 140 to atmosphere via pipe 164, an assumption that will be validated by subsequent description.

With the pipe 140 vented, the pressure chamber 7 in the motor 1 will be void of fluid under pressure and the piston and attached rod 8 will be in their lowermost position, as viewed in the drawing, by virtue of previous effort exerted by preponderance in pressure of fluid in pressure chamber 6, as will be described hereinafter.

Also with the pipe 140 vented, the inlet opening 123 of shuttle valve device 20 will be vented, so that with both inlet openings 122 and 123 in shuttle valve device 20 vented, the outlet of check valve device 21 and the control chamber 102 in the relay valve device 18 will be vented via pipe 160 and said shuttle valve device.

With the outlet of check valve device 21 vented via pipe 160, the pipe 162 hence the volume reservoir 22 and chamber 103 in relay valve device 18 will be void of fluid under pressure.

With its control chamber 102 vented via pipe 160, the relay valve device 18 will be positioned with its communication 118 in establishment venting pipe 140, as previously assumed, and with its communication 119 in disestablishment, preventing supply of fluid under pressure from supply pipe 26 to the pipe 140, as will be appreciated from previous description.

Still further, with the pipe 140 vented via communication 118 in relay valve device 18, the control chamber 102 in relay valve device 19 connected to pipe 140 will be vented and therefore void of fluid under pressure, so that the relay valve device 19 will be positioned with its communication 118 in establishment connecting the supply pipe 26 to the pipe 168, and with its communication 119 in disestablishment disconnecting the pipe 168 from atmosphere via pipe 166.

With pipe 168 connected to the supply pipe 26, the pressure chamber 6 in motor 1 will be charged with fluid at such as fifty pounds for chosen example.

With the fifty pound pressure of fluid in motor chamber 6 preponderating over atmospheric pressure in chamber 7, the piston 5 will be held in its lowermost position in which it previously was assumed to be.

Now assume that it is desired to effect a cycle of operation of the motor 1, the operator will consecutively depress and release the push button 58 of the valve device 17 in rapid succession, by hand or foot, for example.

During the short time that button 58 is depressed, the exhaust valve 48 will be closed and the supply valve 46 will be open long enough to allow a quantity of fluid under fifty pounds pressure to flow from the supply pipe 26 via the temporarily unseated supply valve 46, pipe 33, shuttle valve device 20, and the pipe 160 to the control chamber 102 in the relay valve device 18 and to the inlet chamber 151 in the needle valve device 24.

The needle valve device 24 at this time so restricts flow of fluid under pressure from pipe 160 into the pipe 162 that, momentarily, nearly all of the quantity of fluid under pressure supplied to the pipe 160 flows into the control chamber 102 in the relay valve device 18 to rapidly increase the pressure therein. Also, at this time, even though some small quantity of fluid under pressure may flow through the needle valve device 24, such quantity will not appreciably increase the pressure of fluid in the chamber 103 in the relay valve device 18 due to size of the volume reservoir 22 which also receives fluid under pressure from the pipe 162 and need receive an appreciable quantity of fluid under pressure before any chamber connected to pipe 162 will be increased to any appreciable extent. For sake of illustration, therefore, the pressure of fluid in chamber 103 of the relay valve device 18 at this time may be assumed to remain at substantially atmospheric pressure and the fluid under pressure supplied via pipe 160 to chamber 102 will rapidly build up to cause such as a required twenty pound pressure differential to be established across the respective diaphragm 131 in opposition to action of the respective spring 116 which differential is sufficient to cause the relay valve device 18 to disestablish its communication 118 and simultaneously to establish its communication 119. The pipe 140 thereby is disconnected from the atmosphere and connected to the supply pipe 26, whereupon fluid under pressure will flow from supply pipe 26 via communication 119 in the relay valve device 18 into the pipe 140, thence to the pipe 160 via shuttle valve device 20, to the respective control chamber 102 in the relay valve device 19, and to the pressure chamber 7 in the motor 1.

Such subsequent supply of fluid under pressure to the pipe 160 from the pipe 140 will maintain the relay valve 18, control chamber 102 pressurized to the extent of such as fifty pounds, for example, with adequate pressure differential of at least twenty pounds across the respective diaphragm 101 to maintain establishment of the respective communication 119 through which the pipe 140 is being supplied with fluid under pressure from the supply pipe 26. Fluid under pressure from the pipe 160 also will flow at a controlled rate, depending upon adjusted position of the needle valve element 155, through the needle valve device 24 to the pipe 162, thence to the volume reservoir 22 and the chamber 103 in the relay valve device 18, increasing the pressure in same at said controlled rate.

Meanwhile, fluid at supply pressure supplied to the pipe 140 via device 18 will also flow into the control chamber 102 in the relay valve device 19 whereby the pressure in said chamber will be built up to some such value as forty-five pounds for example, sufficient to overcome action of the respective control spring 116 in absence of opposition by any fluid under pressure in the opposite chamber 103, which is constantly open to atmosphere, and thereby effect disestablishment of the respective communication 118 and substantially simultaneous establishment of the respective communication 119. Thus the pipe 168 becomes disconnected from the supply pipe 26 and connected to atmosphere via the pipe 166, whereupon the fluid under pressure in the pressure chamber 6 in the motor 1 absents itself via pipe 168. With chamber 6 thus vented the fluid under pressure supplied to the pressure chamber 7 in the motor 1 then becomes effective to cause movement of the piston 5 and attached rod 8 to its opposite position defined by engagement of said piston with a shoulder 180 formed in head 3, for example.

The piston 5 is held in such position, as desired, until the flow of fluid under pressure from pipe 160 through needle valve device 24 into pipe 162 to volume reservoir 22 and chamber 103 in relay valve device 18 causes the pressure in said reservoir and chamber to increase to within twenty pounds of the pressure in the respective control chamber 102 in said relay valve device, at which time the respective control spring 116 will act to cause disestablishment of the respective communication 119 and establishment of the communication 118. Thus, the pipe 140 becomes vented to atmosphere, with consequent release of fluid under pressure from the pressure chamber 7 in motor 1. If the motor 1 is mounted in a vertical position and the attached rod 8 and connected means (not shown) to be actuated possesses sufficient weight, such weight may create sufficient force to cause return of the piston 5 to the position in which it is shown in drawing, seated on such as an annular shoulder 181 formed in the head 4, and the chamber 6 would not need be pressurized. On the other hand the nature of the use to which motor 1 might be put may demand pressurization of the chamber 6 and for this reason, the relay valve device 19 is provided.

At the time that fluid under pressure starts to release from the pressure chamber 7 via pipe 140 and communication 118 in relay valve device 18, the pressure of fluid in the control chamber 102 in the relay valve device 19 will correspondingly reduce by flow through said pipe, and when a slight reduction in pressure in said chamber 102 is thus obtained, the respective high compression control spring 116 will effect immediate disestablishment of the respective communication 119 and establishment of the respective communication 118. Thus due to the differential of forty-five pounds pressure required to hold the communication 119 in relay valve device 19 established, the pipe 168 will become connected to the supply pipe 26 to cause pressurization of the pressure chamber 6 in motor 1 substantially at the same time that the opposite pressure chamber 7 is vented, to cause return of the piston 5 to its original position.

At the same time that fluid under pressure from chamber 102 in relay valve device 19 and from pressure chamber 7 in motor 1 releases to atmosphere via pipe 140, fluid under pressure also will release from the volume reservoir 22 and from chamber 103 in the relay valve device 18 via pipe 162, check valve device 21, pipe 160, shuttle valve device 20 and said pipe 140 to establish the same respective conditions of the control apparatus as assumed originally, preparatory to effecting another cycle of operation by depression and release of the push button 58 on valve device 17 as just described.

It should be pointed out, that by adjustment of the needle valve element 155, various rates of pressure build up in the respective chamber 103 in relay valve device 18 may be obtained so as to acquire the desired time that the piston will be maintained in its extended position, opposite to that in which it is shown in the drawing.

Summary

It will now be seen that we have provided fluid pressure apparatus for controlling operation of a fluid pressure motor which will respond to temporary application of manual force, such as punching, or bumping, to a push button valve device to assume an operative position for a desired adjustable preset period of time and then automatically return to its original position.

Having now described our invention, what we claim as new and desire to secure by Letters Patent, is:

1. Fluid pressure control apparatus for controlling operation of a fluid pressure motor, comprising a delivery pipe for conveying fluid under pressure to and from said motor, a source of fluid under pressure, a relay valve device responsive to establishment and disestablishment of a certain degree of preponderance of pressure of fluid in a control chamber over pressure of fluid in another chamber to selectively establish either a first fluid pressure communication between said delivery pipe and said source or a second fluid pressure communication between said delivery pipe and atmosphere, respectively, a shuttle valve device having one inlet, having another inlet connected to said delivery pipe, and having an outlet connected to said control chamber, an operator's valve device operable by manual effort to establish a fluid pressure connection between said source and said one inlet and comprising bias means effective upon termination of said manual effort to terminate said fluid pressure connection, a needle valve device inserted in a fluid pressure communication between said outlet and said other chamber, a check valve device inserted in another communication between said outlet and said other chamber to allow for facile flow of fluid under pressure from the latter to the former but prevent flow of fluid under pressure in the opposite direction via said communication, and a volume reservoir connected to said other chamber.

2. In combination, a fluid pressure operable motor, valve means controlled by opposing pressures of fluid in two chambers and pressure of a spring cooperating with the fluid pressures acting in one of said chambers and operative when the pressure in the other chamber exceeds that in the one chamber by the pressure of said spring to supply fluid under pressure to both of said chambers and said motor and operative when less than the cooperating pressures of said spring and fluid in said one chamber to release fluid under pressure from said motor and both of said chambers, means for restricting flow of fluid under pressure to said one chamber relative to flow of fluid under pressure to said other chamber, a manually operative valve device for supplying fluid under pressure to said other chamber, and a double check valve having an outlet open to said other chamber and inlets open to receive fluid under pressure from, respectively, said valve means and valve device.

3. Fluid pressure control apparatus for controlling operation of a double acting cylinder device having first and second pressure chambers at opposite sides of an actuator piston, respectively, comprising a delivery pipe for conveying fluid under pressure to and from said first pressure chamber, a source of fluid under pressure, a relay valve device responsive to establishment and disestablishment of a certain degree of preponderance of pressure of fluid in a control chamber over pressure of fluid in another chamber to selectively establish either a first fluid pressure communication between said delivery pipe and said source or a second fluid pressure communication between said delivery pipe and atmosphere, respectively, a shuttle valve device having one inlet, having another inlet connected to said delivery pipe, and having an outlet connected to said control chamber, an operator's valve device operable by manual effort to establish a fluid pressure connection between said source and said one inlet and comprising bias means effective upon termination of said manual effort to terminate said fluid pressure connection, a needle valve device inserted in a fluid pressure communication between said outlet and said other chamber, a check valve device inserted in another communication between said outlet and said other chamber to allow for facile flow of fluid under pressure from the latter to the former but prevent flow of fluid under pressure in the opposite direction via said communication, a volume reservoir connected to said other chamber, and another relay valve device responsive to supply and release of fluid under pressure to and from said delivery pipe to selectively establish fluid pressure connection between said second pressure chamber and either atmosphere or said source, respectively.

4. In combination, two control pipes, a double acting fluid motor selectively operable to different positions in response to supply of fluid under pressure to either one of said pipes with the other pipe vented, valve means controlled by opposing pressures in two chambers and operative in response to a chosen preponderance in pressure in one of said chambers over that in the other chamber to supply fluid under pressure to both of said chambers and one of said pipes and operative in response to a less preponderance in said opposing pressures to release fluid under pressure from both of said chambers and said one pipe, means for restricting flow of fluid under pressure to said other chamber and providing for release of fluid under pressure therefrom in unison with release of fluid under pressure from said one chamber, manually operative means separate from said valve means for providing said chosen preponderance, and valve means operative by pressure of fluid in said one pipe to release fluid under pressure from said other pipe and responsive to release of fluid under pressure from said one pipe to supply fluid under pressure to said other pipe.

RALPH C. BROOKS.
FRED S. WHALEY.

REFERENCES CITED

The following references are of record in the file of this patent:

UNITED STATES PATENTS

| Number | Name | Date |
|---|---|---|
| 840,877 | Steedman | Jan. 8, 1907 |
| 2,067,064 | Platz | Jan. 5, 1937 |
| 2,283,826 | Soehner | May 19, 1942 |

FOREIGN PATENTS

| Number | Country | Date |
|---|---|---|
| 412,756 | Great Britain | July 5, 1934 |